(12) United States Patent
Rodriguez et al.

(10) Patent No.: US 12,477,361 B1
(45) Date of Patent: Nov. 18, 2025

(54) EV CHARGING COMMUNICATION NETWORK WITH REDUNDANCY PROTOCOL AND ASSOCIATED METHODS

(71) Applicant: NovaCharge, Inc, Orlando, FL (US)

(72) Inventors: Juan Oscar Rodriguez, Orlando, FL (US); Paul William Boes, Altamonte Springs, FL (US); Jonathan Daniel Gilbert, Orlando, FL (US)

( * ) Notice: Subject to any disclaimer, the term of this patent is extended or adjusted under 35 U.S.C. 154(b) by 358 days.

(21) Appl. No.: 18/126,821

(22) Filed: Mar. 27, 2023

Related U.S. Application Data

(60) Provisional application No. 63/324,699, filed on Mar. 29, 2022.

(51) Int. Cl.
| | | |
|---|---|---|
| H04W 24/04 | (2009.01) | |
| H04L 12/66 | (2006.01) | |
| H04J 1/00 | (2006.01) | |

(52) U.S. Cl.
CPC .............. H04W 24/04 (2013.01); H04L 12/66 (2013.01)

(58) Field of Classification Search
CPC .. H04L 12/66; H04W 52/0206; H04W 88/16; H04W 24/04
USPC ........ 370/216, 241, 252, 329, 242, 328, 401
See application file for complete search history.

(56) References Cited

U.S. PATENT DOCUMENTS

| | | | | |
|---|---|---|---|---|
| 7,773,571 B1* | 8/2010 | Maxwell | ........... | H04W 36/0033 370/339 |
| 11,173,797 B2* | 11/2021 | Sambaraju | .............. | B60L 53/53 |
| 2010/0134067 A1* | 6/2010 | Baxter | .................. | B60L 3/0084 320/109 |
| 2021/0086651 A1* | 3/2021 | Maeda | .................... | B60L 53/66 |
| 2023/0182608 A1* | 6/2023 | Suto | ........................ | G06Q 50/06 320/137 |
| 2024/0007956 A1* | 1/2024 | Singh | ................ | H04W 52/0229 |

\* cited by examiner

*Primary Examiner* — John Pezzlo
(74) *Attorney, Agent, or Firm* — Bullock Law; Stephen Bullock

(57) ABSTRACT

An Electrical Vehicle (EV) charging station and communication network with redundancy protocol including a network server, a plurality of gateways with at least a first and second gateway, and a plurality of EV charging stations structured to be in WiFi communication with the plurality of gateways. First gateway, by default is the primary gateway and structured to be in cellular communication with the network server via first cellular communication provider. Second gateway by default is available as a charger, but in standby and structured to be in cellular communication with the network server via second cellular communication provider. The plurality of EV charging stations is structured to send and receive charging information via WiFi first gateway when it is the active primary gateway. They are structured to switch to second gateway when it has become the primary gateway due to communication failure of the first gateway with the network server.

1 Claim, 4 Drawing Sheets

FIG. 1
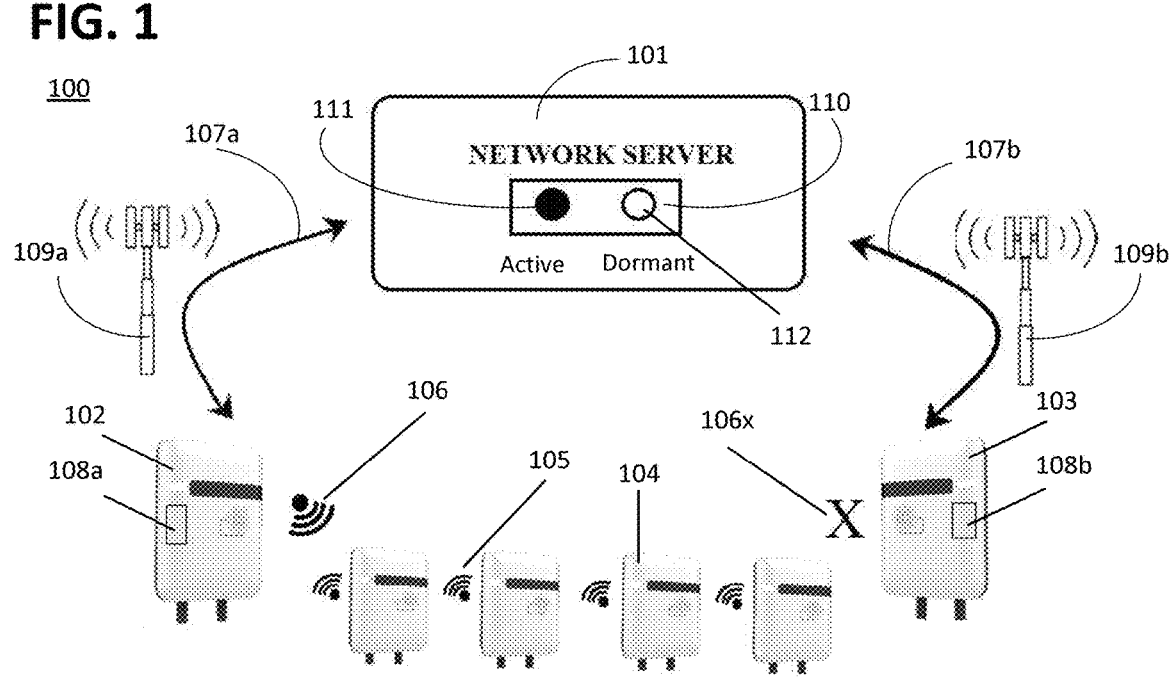
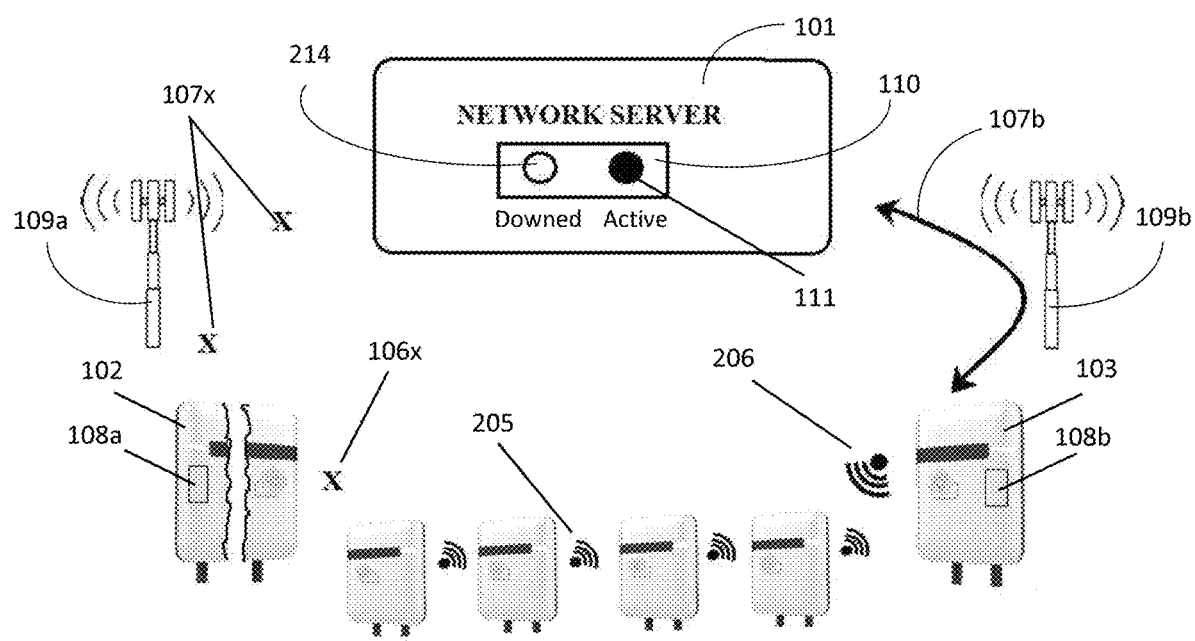
FIG. 2a

FIG. 2b
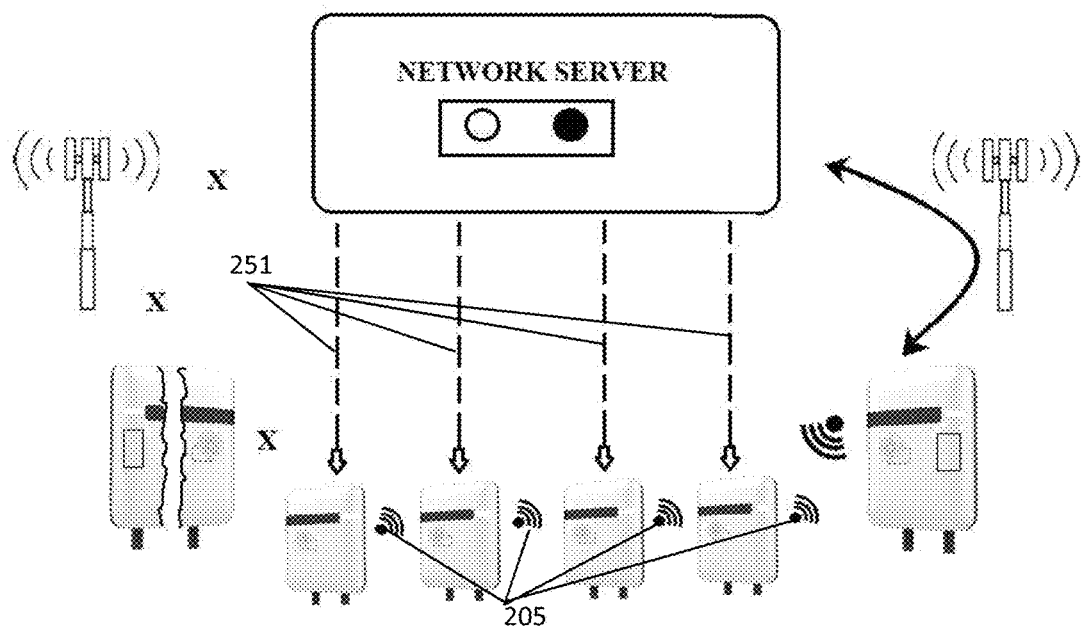
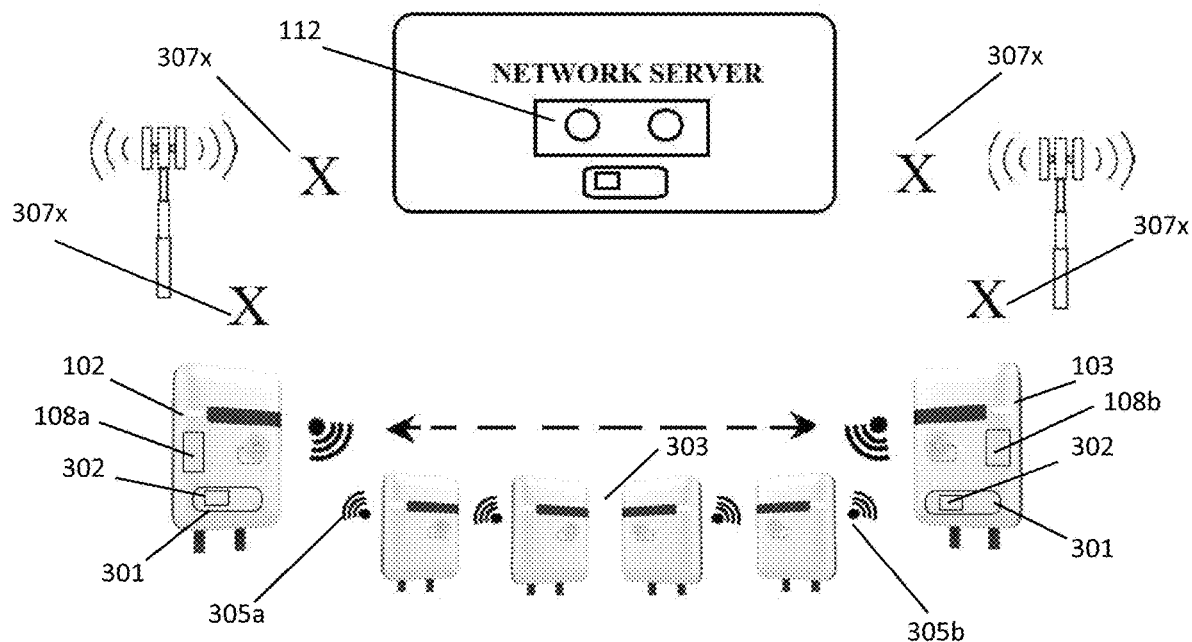
FIG. 3a

EV CHARGING COMMUNICATION NETWORK WITH REDUNDANCY PROTOCOL AND ASSOCIATED METHODS

FIELD OF THE INVENTION

The present invention relates to systems and methods for electric vehicle charging station communication and responsive system action. In particular, the present invention relates to an EV Charging Communication Network and Associated Methods.

BACKGROUND

Cellular communication between a gateway and its network server are often disrupted due to natural hazards, service provider failure, equipment inoperability, catastrophic failure, and the like. EV charging networks having their individual charging stations connected to an inoperable gateway become disrupted themselves.

There exists a need for contingent redundancy protocol in the EV charging station environment to ensure continued operability of the individual charging stations during disruptive events. Therefore, there exists a need in the art for an improved EV charging communication network and associated methods.

This background information is provided to reveal information believed by the applicant to be of possible relevance to the present invention. No admission is made as to prior art and nothing within the background should be construed as prior art against the present invention.

SUMMARY OF THE INVENTION

Embodiments of the present invention are related an Electrical Vehicle (EV) charging station and communication network with redundancy protocol including a network server, a plurality of gateways with at least a first and second gateway, and a plurality of EV charging stations structured to be in WiFi communication with the plurality of gateways. The first gateway, by default is the primary gateway and structured to be in cellular communication with the network server via first cellular communication provider. The second gateway by default is available as a charger, but in standby and structured to be in cellular communication with the network server via second cellular communication provider. The plurality of EV charging stations is structured to send and receive EV charging information via WiFi to the first gateway when it is the active primary gateway. They are structured to switch to the second gateway when it has become the primary gateway due to communication failure of the first gateway with the network server.

BRIEF DESCRIPTION OF THE DRAWINGS

FIG. 1 is a diagrammatic overview of an EV Charging Communication Network and Associated Methods according to an embodiment of the invention.

FIG. 2a is a diagrammatic overview of the EV Charging Communication Network and Associated Methods illustrated in FIG. 1 according to an embodiment of the invention.

FIG. 2b is a diagrammatic overview of the EV Charging Communication Network and Associated Methods illustrated in FIG. 1 according to another embodiment of the invention.

FIG. 3a is a diagrammatic overview of the EV Charging Communication Network and Associated Methods according to another embodiment.

DETAILED DESCRIPTION OF THE INVENTION

Figure 3B:
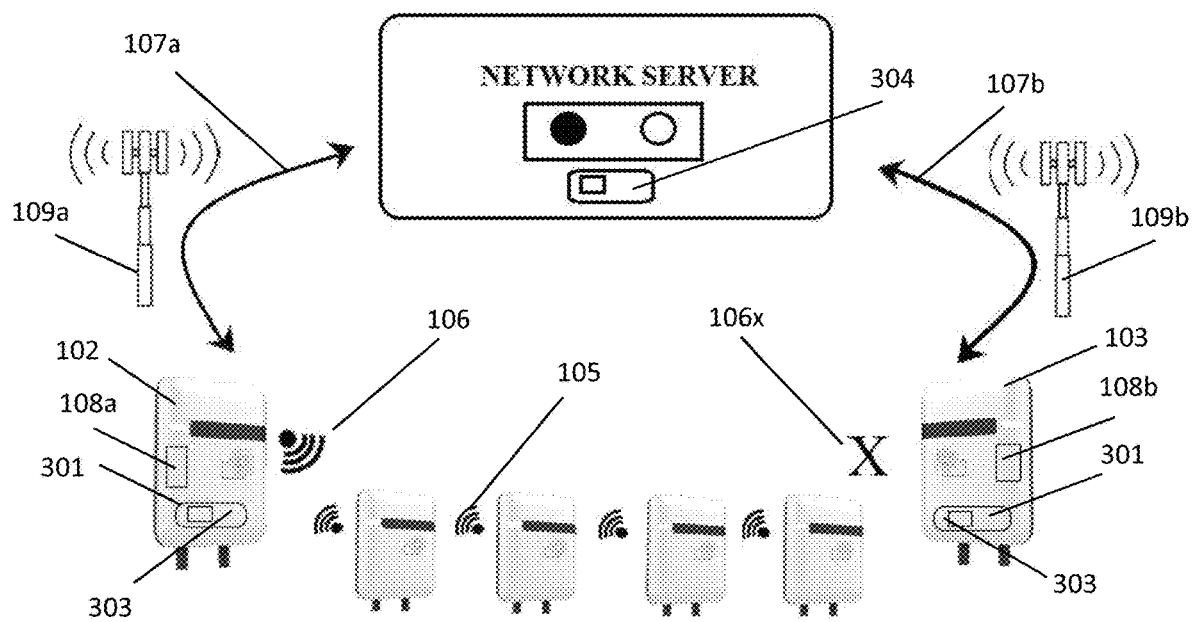
FIG. 3b is a diagrammatic overview of the EV Charging Communication Network and Associated Methods illustrated in FIG. 3a according to an embodiment of the invention.

The present invention will now be described in detail with reference to the accompanying drawings. The embodiment descriptions are illustrative and not intended to be limiting in any way. Other embodiments of the invention will readily suggest themselves to persons with ordinary skill in the art after having the benefit of this disclosure. Accordingly, the following embodiments are set forth without any loss of generality and without imposing limitation upon the claimed invention.

Directional terms such as "above" "below" "upper" "lower" and other like terms are used for the convenience of the reader in reference to the drawings. Additionally, the description may contain terminology to convey position, orientation, and direction without departing from the principles of the present invention. Such positional language should be taken in context of the represented drawings.

Quantitative terms such as "generally" "substantially" "mostly" and other like terms are used to mean that the referred object, characteristic, or quality constitutes a majority of the referenced subject. Likewise, use of the terms such as first and second do not necessarily designate a limitation of quantity. Such terms may be used as a method of describing the presence of at least one of the referenced elements or may provide a means of differentiating orientation. The meaning of any term within this description is dependent upon the context within which it is used, and the meaning may be expressly modified.

Referring now to FIG. 1, an EV Charging Communication Network 100, hereinafter referred to as the network 100, may include a network server 101 and a plurality of gateways including at least a first gateway 102 and a second gateway 103. The first and second gateways 102, 103 may be in cellular communication 107a, 107b with the network server 101. Each gateway 102, 103 may include its own unique SIM card 108a, 108b directed to its own dedicated cell tower and service provider 109a, 109b. By way of non-limiting example, the first gateway 102 may include a SIM card 108a directed to a cell tower 109a associated with a first service provider. Hence, the first gateway 102 may be in cellular communication 107a with a service provider such as Verizon®. Likewise, the second gateway 103 may be in cellular communication 107b with a second service provider such as AT&T® via second SIM card 108b. Because the network 100 includes varied service providers per respective gateway, it may diversify the communication redundancy in case of outage or inaccessibility of one service provider or another.

The network 100 may also include individual charging stations 104 each in communication via Wi-Fi 105 with a primary gateway Wi-Fi 106. FIG. 1 illustrates gateway 102 as the primary gateway. The primary gateway 102 may be used during normal operations. As such, the network server 101 may be in cellular communication 107*a* with the primary gateway 102 and the primary gateway in turn may be in communication with the individual charging stations 104 via Wi-Fi 105, 106. Similarly, the individual charging stations 104 may be in Wi-Fi communication 105, 106 with the primary gateway 102 in order for it to relay information to the network server 101 via cellular communication 107*a*.

The network 100 may also include a secondary gateway 103 utilizing a secondary cellular communication channel 107*b* that may also be enabled to communicate to the individual charging stations 104 via Wi-Fi. However, the secondary Wi-Fi communication 106*x* by the secondary gateway 103 may be inactive as a default allowing the primary gateway 102 to serve as the sole means for communication between the network server 101 and the individual charging stations 104. In some embodiments, the secondary gateway 103 by default may also be available as an individual charging station 104, but in standby as a backup primary gateway. As such, it may simultaneously be structured to be in cellular communication with the network server 101 via its own service provider 109*b* when required.

As shown, the network server 101 may include a network smart switch 110 structured to channel communications to an active primary gateway, in this case gateway 102. During its initial configuration, the network smart switch 110 may be programmed to default to a specific primary gateway 102 initiating that gateway as the primary means for communication with the charging stations 104.

In some embodiments, the network server 101 may be structured to transmit a specific identifier to signify the active gateway. The gateway that receives the identifier may be configured to remain active so long as it is receiving the identifier. The gateway that is not receiving the identifier may be configured to lay dormant until it does receive the specified identifier. Here, the network server smart switch 110 has been configured to set gateway 102 as the primary active gateway 111 and as a result has set gateway 103 as a dormant redundant gateway 112.

FIG. 2*a* illustrates a scenario whereby the default primary gateway 102 has been downed due to natural hazard, service provider failure, equipment inoperability, catastrophic failure of the primary gateway, hardware electronics failure, vandalism, accident, or the like. At this point, the network server 101 recognizes that there is a cellular signal loss 107*x* from gateway 102 via the first cellular service provider 109*a*. Likewise, gateway 102 has an inactive Wi-Fi communication stream 106*x* with the individual charging stations 104. Therefore, the network server smart switch 110 immediately changes the status of gateway 102 from "Active" to "Downed". Simultaneously, the network server smart switch 110 has changed the status of gateway 103 from "Dormant" to "Active".

Now, gateway 103 is designated as the primary gateway and the network server 101 has redirected cellular communication 107*b* with the individual charging stations 104 by and through the new primary gateway 103. As previously mentioned, in some embodiments, this may be actuated by the network server 101 switching the specific identifier broadcast from gateway 102 to gateway 103. As a result, the individual charging stations 104 have redirected their Wi-Fi communication 205 to the new primary gateway, which is gateway 103. Gateway 103 may now communicate with the network server 101 via the second service provider such as AT&T® utilizing its specific SIM card 108*b*.

FIG. 2*b* illustrates that in some embodiments, the network server 101 may be structured to directly communicate 251 with the individual charging stations 104 to indicate which gateway is designated as the primary gateway. This direct communication 251 with the individual charging stations 104 may be necessary in times of gateway failure or communication outages 107*x* with the cellular service provider. As shown, the network server 101 is instructing the individual charging stations 104 to redirect communication 205 through a new primary gateway 102. Likewise, in some embodiments, the network server 101 may take over direct communication 251 and instruction with the individual charging stations 104 bypassing all gateways. Hence, in this embodiment the network server 101 may give direct instruction sets to the individual charging stations 104 while a primary or secondary gateway is being repaired.

FIGS. 3*a* and 3*b* illustrate another embodiment of the invention whereby the network 100 may be transitioned from a localized Wi-Fi communication network to a centralized network server based smart system.

FIG. 3*a* shows a system without cellular communication channels enabled 307*x* and with the network server smart switch 110 disabled. In this embodiment, each gateway 102, 103 may serve as the primary gateway for a plurality of individual charging stations 104. As shown, gateway 102 may be in Wi-Fi communication 305*a* with a pair of individual charging stations 104 and gateway 103 may be in Wi-Fi communication 305 with a different pair of individual charging stations 104. Furthermore, the gateways 102, 103 may be in Wi-Fi communication with each other 303. Therefore, if one gateway, for example gateway 102 has been downed, gateway 103 may recognize the absence of Wi-Fi communication with its counterpart and may take its place as the primary gateway for the plurality of individual charging stations that were formerly under Wi-Fi direction of the downed gateway.

In some embodiments, each gateway 102, 103 may be equipped with its own gateway smart switch 301 as well as its own individualized SIM card 108*a*, 108*b*. Therefore, a system 100 may be transitioned from a Wi-Fi only communication system as depicted in FIG. 3*a* to the hybrid Wi-Fi and cellular system depicted in FIG. 3*b*.

By way of non-limiting example, the owner of a plurality of individual charging stations at a particular location may initially opt for a membership plan that encompasses only Wi-Fi communication and is not centrally controlled by the network server 101. In this embodiment, the owner would be responsible for the maintenance and control of their own individual charging stations 104. Should the owner decide to upgrade their service, they may transition the gateway smart switch 301 from an inactive position 302 (FIG. 3*a*) to an active position 303 (FIG. 3*b*). Once the gateway smart switch 301 is in an active position, cellular communication 107*a*, 107*b* with the network server 101 may be initiated and the network 100 may assume the operations as outlined in FIG. 1 and FIG. 2.

In some embodiments, the gateway smart switch 301 may serve as a designator for which gateway is to act as the primary gateway within the system. For example, if an owner wishes to upgrade their service from a Wi-Fi only enabled system to a cellular based system, the gateway chosen by the owner to be activated via the gateway smart switch 301 may by default become the primary gateway in the cellular based system. In other embodiments, the network server 101 may include its own transition switch 304 that may changeover a particular owner's set of localized individual charging stations 104 to the cellular based system when requested by the owner. This network server transition switch 304 may obviate the need for the owner to manually transition the system themselves.

Figure 3C:
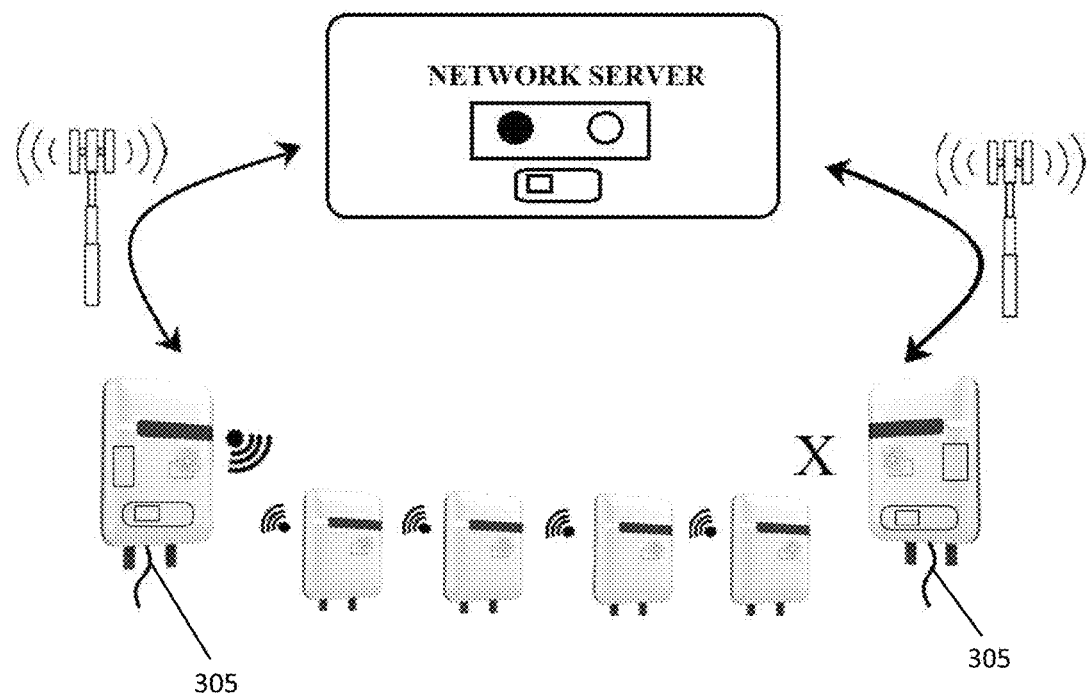
FIG. 3c is a diagrammatic overview of the EV Charging Communication Network and Associated Methods illustrated according to another embodiment of the invention.

FIG. 3C illustrates another embodiment whereby a third means of redundancy may be utilized to insure continued operation of the network 100 during an outage of either Wi-Fi or cellular communication. In this embodiment, each individual gateway 102, 103 may be equipped with an ethernet port and connection 305 to serve as its communication means with the network server 101. Likewise, in some embodiments, each individual charging station may be equipped with an ethernet port and connection. By way of non-limiting example, the network 100 may start as a Wi-Fi only based system and then be transitioned to a hybrid cellular based system with ethernet backup. Therefore, should Wi-Fi fail, the system may easily transition over to ethernet as a backup communication means. Hence, the individual charging stations may communicate through ethernet 305 with each other and the gateways 102, 103 may communicate with the network server 101 through ethernet 305 as well. However, one skilled in the art will appreciate that the hierarchy of communication means may be varied and either may serve as a backup to the other. In other words, a Wi-Fi based system may be backed up with ethernet or cellular. The same is true for an ethernet based system or hybrid cellular and Wi-Fi based system. The order of how the network 100 transitions from one backup to the other may not be as important as the transition itself to insure continued uninterrupted operation of the network 100.

Figure 4:
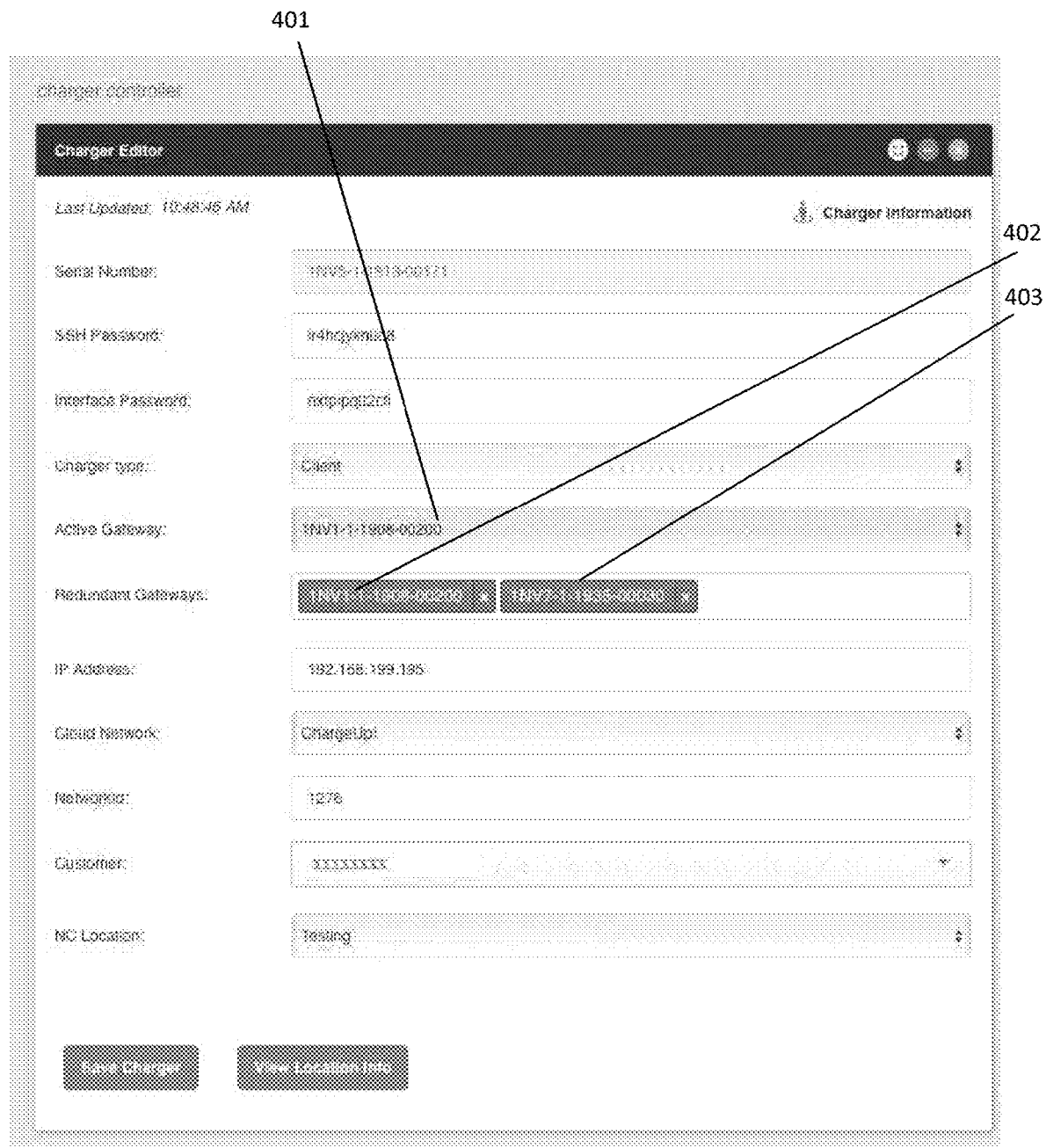
FIG. 4 is a depiction of a graphical user interface (GUI) utilized in one embodiment of the invention.

FIG. 4 illustrates an embodiment of the graphical user interface (GUI) that may be used with the network 100. As shown, the network 100 may include an active gateway 401 and one or more redundant gateways 402, 403. The active gateway 401 may represent the primary gateway 102 depicted in FIG. 1. The redundant gateways 402, 403 may be the secondary gateway 103 depicted in FIG. 1. Of particular importance to note is that the network 100 may utilize a plurality of redundant, or secondary gateways 103 as backups to the primary gateway. Meaning, if the active primary gateway 102, 401 fails, a secondary gateway 103, 402 may take its place. If the secondary gateway 103, 402 should fail, a replacement redundant gateway 403 would take its place as the primary. Each gateway may be the primary gateway to a plurality of individual charging stations 104 and there may be a plurality of gateways within one localized system.

It is contemplated to be within the scope of this application that the final decision determining whether and how the network 100 is to change to an alternate or redundant communication path may rest with any one of the gateways 102, 103, the network server 101, or the individual charging stations 104. This may occur by one of the gateways 102, 103 not receiving a notification and initiating the transfer to itself. It may occur by the network server 101 not receiving a proper signal indicating normal operation and switching communication to either another gateway or directly communicating with the individual charging stations 104. It may also occur by the individual charging stations 104 either not receiving an identifying broadcast signal or realizing their normal instruction sets are not being carried out and changing the communication path to a redundant alternative on their own initiative. However, after having the benefit of reading this application one skilled in the art will appreciate that when and how the communication modes are transferred to a redundant alternative may be achieved by a number of combinations given the plurality of methods disclosed herein.

That which is claimed is:

1. An EV charging station and communication network with redundancy protocol comprising
   a network server;
   a plurality of gateways including at least a first gateway and a second gateway;
   a plurality of Electrical Vehicle (EV) charging stations configured to be in WiFi communication with the plurality of gateways;
   wherein the first gateway is configured to be in cellular communication with a first cellular communication provider;
   wherein the second gateway is configured to be in cellular communication with a second cellular communication provider that is different from the first cellular communication provider;
   wherein the plurality of EV charging stations is configured to send and receive EV charging information via WiFi communication to the first gateway, defined as the primary gateway, which is active by default;
   wherein the first gateway is configured to send and receive the EV charging station information to the network server via the first cellular communication provider by default;
   wherein the plurality of EV charging stations is configured to send and receive information via WiFi communication to the second gateway when the plurality of EV charging stations has determined that communication has failed with the network server via the first gateway;
   wherein the second gateway is configured to switch from dormant to active to become the primary gateway for communication with the network server via the second cellular communication provider when communication with the network server has failed via the first gateway.

* * * * *